United States Patent
Son et al.

(10) Patent No.: US 11,539,054 B2
(45) Date of Patent: Dec. 27, 2022

(54) METHOD OF MANUFACTURING CATALYST INK FREE OF ELUTED TRANSITION METAL FOR FUEL CELL

(71) Applicants: Hyundai Motor Company, Seoul (KR); Kia Motors Corporation, Seoul (KR)

(72) Inventors: Dae Yong Son, Seoul (KR); Dong Hwan Yoon, Gyeonggi-do (KR); Yoon Hwan Cho, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/107,272

(22) Filed: Nov. 30, 2020

(65) Prior Publication Data

US 2021/0288335 A1    Sep. 16, 2021

(30) Foreign Application Priority Data

Mar. 13, 2020    (KR) .................. 10-2020-0031430

(51) Int. Cl.
| | | |
|---|---|---|
| *H01M 4/92* | (2006.01) | |
| *H01M 4/88* | (2006.01) | |
| *B01J 23/63* | (2006.01) | |
| *B01J 23/54* | (2006.01) | |
| *B01J 23/38* | (2006.01) | |
| *B01J 23/64* | (2006.01) | |
| *B01J 23/40* | (2006.01) | |
| *B01J 23/48* | (2006.01) | |
| *B01J 23/656* | (2006.01) | |
| *B01J 23/652* | (2006.01) | |

(52) U.S. Cl.
CPC ......... *H01M 4/923* (2013.01); *H01M 4/8828* (2013.01); *B01J 23/38* (2013.01); *B01J 23/40* (2013.01); *B01J 23/48* (2013.01); *B01J 23/54* (2013.01); *B01J 23/63* (2013.01); *B01J 23/64* (2013.01); *B01J 23/6522* (2013.01); *B01J 23/6562* (2013.01)

(58) Field of Classification Search
CPC ...... H01M 4/923; H01M 4/8828; B01J 23/38; B01J 23/40; B01J 23/48; B01J 23/54; B01J 23/63; B01J 23/64; B01J 23/6522; B01J 23/6562
USPC .................................................. 427/125, 115
See application file for complete search history.

(56) References Cited

U.S. PATENT DOCUMENTS

| | | | | |
|---|---|---|---|---|
| 7,223,493 | B2 * | 5/2007 | Terada | H01M 8/1007 |
| | | | | 429/535 |
| 7,569,302 | B2 | 8/2009 | Tanaka et al. | |
| 10,026,968 | B2 * | 7/2018 | Horikita | H01M 4/8882 |
| 10,038,200 | B2 * | 7/2018 | Kim | H01M 4/8825 |
| 10,147,956 | B2 * | 12/2018 | Nagami | H01M 4/8803 |
| 10,615,424 | B2 * | 4/2020 | Lee | H01M 4/90 |

(Continued)

FOREIGN PATENT DOCUMENTS

| | | |
|---|---|---|
| JP | 2005-317373 A | 11/2005 |
| JP | 4908846 B2 | 4/2012 |

(Continued)

*Primary Examiner* — Brian K Talbot
(74) *Attorney, Agent, or Firm* — Fox Rothschild LLP

(57) ABSTRACT

Disclose is a method of manufacturing catalyst ink for a fuel cell, and particularly the method includes removing eluted transition metal from a noble-metal/transition-metal alloy catalyst.

10 Claims, 1 Drawing Sheet

(56) References Cited

U.S. PATENT DOCUMENTS

| | | | |
|---|---|---|---|
| 10,693,146 B2* | 6/2020 | Watanabe | B22F 9/22 |
| 11,145,873 B2* | 10/2021 | Yamasaki | H01M 4/8642 |
| 11,145,874 B2* | 10/2021 | Matsutani | H01M 4/8882 |
| 11,189,841 B2* | 11/2021 | Senoo | H01M 4/926 |
| 2004/0087441 A1 | 5/2004 | Bock et al. | |
| 2012/0148936 A1* | 6/2012 | Uensal | H01M 4/926 |
| | | | 429/483 |
| 2013/0302715 A1* | 11/2013 | Horikita | H01M 8/1011 |
| | | | 502/185 |
| 2016/0197369 A1* | 7/2016 | Lee | H01M 4/8842 |
| | | | 429/480 |
| 2018/0248198 A1* | 8/2018 | Yadav | B32B 27/322 |
| 2019/0088966 A1* | 3/2019 | Choi | H01M 4/90 |
| 2019/0336956 A1* | 11/2019 | Suzue | B01J 35/0046 |
| 2020/0243872 A1* | 7/2020 | Kakinuma | H01M 8/1004 |

FOREIGN PATENT DOCUMENTS

| | | |
|---|---|---|
| KR | 1999-0063771 A | 7/1999 |
| KR | 2014-0039382 A | 4/2014 |
| KR | 101575463 B1 | 12/2015 |
| KR | 101640545 B1 | 7/2016 |
| WO | 2012/098712 A1 | 7/2012 |

* cited by examiner

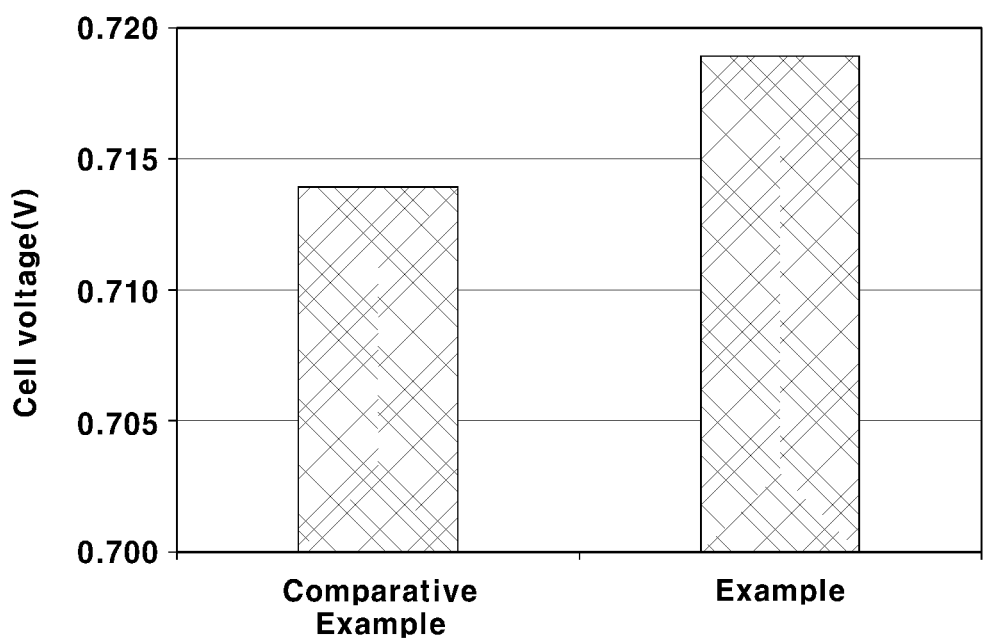

METHOD OF MANUFACTURING CATALYST INK FREE OF ELUTED TRANSITION METAL FOR FUEL CELL

CROSS REFERENCE TO RELATED APPLICATION

The present application claims priority based on Korean Patent Application No. 10-2020-0031430, filed on Mar. 13, 2020, the entire content of which is incorporated herein for all purposes by this reference.

TECHNICAL FIELD

The present invention relates to a method of manufacturing catalyst ink for a fuel cell, and in particular, the method includes removing eluted transition metal from a noble-metal/transition-metal alloy catalyst.

BACKGROUND

A fuel cell is a power generation device in which chemical energy of fuel is converted into electric energy through electrochemical reaction in a fuel cell stack, rather than conversion into heat through combustion, and may be utilized not only to supply power to industrial, domestic and vehicular applications, but also to supply power to small electric/electronic products, especially portable devices.

Currently, a polymer electrolyte membrane fuel cell (PEMFC or proton exchange membrane fuel cell), having the highest power density among fuel cells serving as power sources for vehicle applications, has been studied, and has a fast start-up time and a fast power-conversion reaction time due to the low operating temperature thereof.

Meanwhile, the electrode catalyst used in the fuel cell mainly includes platinum (Pt)-based noble metal and is thus disadvantageous because of the high manufacturing costs and increased economic burden. In the polymer electrolyte membrane fuel cell, the oxygen reduction reaction at the cathode causes overvoltage at least 10 times as large as the hydrogen oxidation reaction at the anode. Moreover, commercialization thereof has been delayed due to the use of platinum, which is in limited supply and is very expensive. Therefore, research and development into alloy catalyst materials that use less platinum has been actively conducted.

The alloy catalyst material makes it possible to manufacture a high-performance catalyst electrode having increased catalytic activity using a small amount of platinum compared to a pure platinum material, thereby enabling commercialization thereof. The alloy catalyst material can include two or more phases alloyed, which is generally distinguished from a mixed catalyst material in which two elements are mixed.

Meanwhile, binary and ternary alloy catalysts (e.g., PtCo, PtNi, PtY, PtNiCr, PtCoCr, etc.), used as catalysts for fuel cells, are problematic in that transition metal is eluted from the alloy catalyst during the production of catalyst ink. When an electrode is manufactured using ink containing the eluted transition metal and is applied to a membrane-electrode assembly (MEA), the eluted transition metal acts as an impurity in the electrode, thus deteriorating the performance of the catalyst, and may move to the electrolyte membrane to thus form radicals, undesirably causing degradation of the electrolyte membrane.

SUMMARY OF THE INVENTION

In preferred aspects, provided is a method of manufacturing catalyst ink including an alloy catalyst, which may prevent the deterioration of catalyst performance or degradation of an electrolyte membrane due to the eluted transition metal, which occurs in conventional cases.

The objectives of the present invention are not limited to the foregoing, and will be able to be clearly understood through the following description and to be realized by the means described in the claims and combinations thereof.

In a first preferred aspect, methods of manufacturing catalyst ink for a fuel cell are provided comprising: admixing 1) an alloy catalyst comprising a noble metal and a transition metal and 2) polymer particles, whereby an aggregate comprising i) the transition metal and ii) polymer particles forms. In certain preferred aspects. an admixture is provided comprising an alloy catalyst comprising a noble metal and a transition metal, an ionomer and a solvent; and the admixture and polymer particles to form an aggregate comprising) the transition metal associated with the alloy catalyst and 2) the polymer particles. As desired, the aggregate is removed or associated by filtration or other procedure. In further preferred aspect, provided is a method of manufacturing catalyst ink for a fuel cell. The method include preparing an admixture such as a solution including an alloy catalyst including a noble-metal and a transition-metal, an ionomer and a solvent, combining the solution and polymer particles to form an aggregate of the transition metal eluted from the alloy catalyst and the polymer particles, and removing the aggregate by filtering the solution. For example, the solution may be added to the polymer particles.

The term "ionomer" as used herein refers to a polymeric material or resin that includes ionized groups attached (e.g. covalently bonded) to the backbone of the polymer as pendant groups. Preferably, such ionized groups may be functionalized to have ionic characteristics, e.g., cationic or anionic. The ionomer may suitably include one or more polymers selected from the group consisting of a fluoro-based polymer, a perfluorosulfone-based polymer, a benz-imidazole-based polymer, a polyimide-based polymer, a polyetherimide-based polymer, a polyphenylene sulfide-based polymer, a polysulfone-based polymer, a polyether-sulfone-based polymer, a polyetherketone-based polymer, a polyether-etherketone-based polymer, a polyphenylquinoxa-line-based polymer and a polystyrene-based polymer.

The noble metal may include one or more selected from the group consisting of platinum (Pt), iridium (Ir), palladium (Pd), ruthenium (Ru), rhodium (Rd), gold (Au), and silver (Ag).

The transition metal may include one or more selected from the group consisting of cobalt (Co), nickel (Ni), yttrium (Y), chromium (Cr), manganese (Mn), copper (Cu), lanthanum (La), and scandium (Sc).

The alloy catalyst may be supported on a support.

The polymer particles may include a chelating resin.

The polymer particles may include, as a side chain, one or more chelating formation groups selected from the group consisting of glutamine, amidoxime, thiol, iminodiacetic acid, aminophosphonic acid, phosphonic acid, sulfonic acid, polyamine, thiourea, aminomethyl phosphonic acid, benzylamine, tertiary amine, and derivatives thereof.

The polymer particles may include one or more selected from the group consisting of an iminodiacetic-acid-type chelating resin, and an aminophosphonic-acid-type chelating resin.

The polymer particles may have an average diameter ranging from about 300 μm to about 800 μm.

The solution may be added with the polymer particles and allowed to react at a temperature of about 25° C. to 60° C.

for about 10 hr to 30 hr to afford an aggregate of the transition metal and the polymer particles.

The aggregate may be removed by filtering the solution using a filter of 32 mesh to 400 mesh.

In an aspect, provided is a method of manufacturing an electrode for a fuel cell, including preparing catalyst ink manufactured by the method described herein and forming a catalyst layer by applying the catalyst ink on a substrate and performing drying.

According to various exemplary embodiments of the present invention, it is possible to remove transition metal that is eluted from an alloy catalyst during the manufacture of catalyst ink, thus effectively preventing the deterioration of catalyst performance or degradation of an electrolyte membrane due to the transition metal.

The effects of the present invention are not limited to the foregoing, and should be understood to include all effects that can be reasonably anticipated from the following description.

Other aspects of the invention are disclosed infra.

BRIEF DESCRIPTION OF DRAWING

FIG. 1 shows the results of evaluation of cell performance of membrane-electrode assemblies of Example and Comparative Example in Test Example according to an exemplary embodiment of the present invention.

DETAILED DESCRIPTION

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurements that essentially occur in obtaining these values, among others, and thus should be understood to be modified by the term "about" in all cases.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated. In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

In an aspect, provided is a method of manufacturing catalyst ink for a fuel cell includes preparing a solution including an alloy catalyst including a noble metal and a transition metal, an ionomer and a solvent, combining (e.g., by adding) the solution and polymer particles to form an aggregate of the transition metal eluted from the alloy catalyst and the polymer particles, and removing the aggregate by filtering the solution.

The noble-metal/transition-metal alloy catalyst may be at least a binary or ternary alloy catalyst of noble metal and transition metal.

The noble metal may include one or more selected from the group consisting of platinum (Pt), iridium (Ir), palladium (Pd), ruthenium (Ru), rhodium (Rd), gold (Au), and silver (Ag).

The transition metal may include one or more selected from the group consisting of cobalt (Co), nickel (Ni), yttrium (Y), chromium (Cr), manganese (Mn), copper (Cu), lanthanum (La), and scandium (Sc).

The alloy catalyst may be supported on a support.

The support is not particularly limited, and may include carbon black, carbon nanotubes, carbon nanofiber, metal oxide, noble metal, or the like.

The ionomer functions as a kind of binder. The type thereof is not particularly limited, and a perfluorinated-sulfonic-acid-based polymer, such as Nafion, may be used.

The solvent may include one or more alcohol solvents selected from the group consisting of ethylene glycol, butanol, amyl alcohol, dimethyl acetamide, dimethyl sulfoxide, dimethyl formamide, dipropylene glycol, isopropyl alcohol, normal propyl alcohol and ethyl alcohol, deionized water, or mixtures thereof.

The solution may include a cation of the transition metal that is eluted from the alloy catalyst into the solvent, and thus, when an electrode is manufactured using such a solution as catalyst ink, catalyst performance may deteriorate or the electrolyte membrane may degrade due to the cation of the transition metal. Particularly, the method may include removing the cation of the transition metal.

The solution may be added with polymer particles to form an aggregate of the transition metal eluted from the alloy catalyst and the polymer particles, after which the solution is filtered, thereby easily removing the aggregate.

In particular, a chelating resin (agent) may be used as the polymer particles.

Preferably, the chelating resin that forms a chemical bond, such as covalent bond, coordination bond, etc., with the transition metal may be used as the polymer particles, whereby the polymer particles do not bind to the transition metal that is alloyed with the noble metal, but merely bind to the free transition metal (cation of the transition metal). Therefore, according to the present invention, the eluted transition metal alone may be selectively removed.

Moreover, the polymer particles form a coordination bond, such as covalent bond, coordination bond, and the like, with the eluted transition metal, so even when a subsequent process such as filtration, and the like is performed, the bond with the transition metal may not break down.

The polymer particles may have any one main chain selected from the group consisting of polystyrene, polyacryl and divinylbenzene. Specifically, the main chain of the polymer particles may be polystyrene-divinylbenzene copolymer, polyacrylonitrile, polyethylene, polymethacrylate, phenol resin, and the like.

The polymer particles may have, as a side chain, one or more chelating formation groups selected from the group consisting of glutamine, amidoxime, thiol, iminodiacetic acid, aminophosphonic acid, phosphonic acid, sulfonic acid, polyamine, thiourea, aminomethyl phosphonic acid, benzylamine, tertiary amine, and derivatives thereof.

Although not limited thereto, the polymer particles may be an aminophosphonic-acid-type chelating resin represented by Structural Formula 1 below or an iminodiacetic-acid-type chelating resin represented by Structural Formula 2 below. Here, "-type chelating resin" means a chelating resin having a chelating formation group corresponding to "-".

[Structural Formula 1]

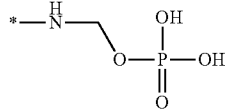

Here, * designates the connection point with the main chain.

[Structural Formula 2]

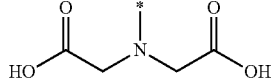

Here, * designates the connection point with the main chain.

The polymer particles may have an average diameter of about 300 μm to 800 μm. When the average diameter of the polymer particles falls in the above numerical range, the aggregate of the polymer particles and the eluted transition metal may be easily removed through filtration.

The solution is added with the polymer particles and allowed to react at a temperature of about 25° C. to 60° C. for about 10 hr to 30 hr, thereby forming an aggregate of the polymer particles and the eluted transition metal. When the reaction time is less than about 10 hr, the amount of the eluted transition metal that is removed may be insufficient. From the viewpoint of shortening the reaction time, it may be desirable to keep the reaction temperature close to about 60° C.

The solution including the aggregate may be filtered using a filter, thereby removing the aggregate. The filter may have a mesh size less than the average diameter of the aggregate and greater than the average diameter of the noble-metal/transition-metal alloy catalyst. Preferably, the filter may have a size of 32 mesh to 400 mesh. However, the present invention is not limited thereto, and the filter size may be appropriately changed in consideration of the average diameter of the polymer particles that are used.

The solution may be filtered using a gravity filter or a vacuum filter at room temperature.

The catalyst ink thus manufactured may be applied on a substrate and dried, thus forming a catalyst layer. Any specific method and conditions thereof are not particularly limited, and any method may be applied so long as it is a method of manufacturing an electrode with catalyst ink, which is widely used in the technical field to which the present invention belongs.

A better understanding of the present invention will be given through the following examples. However, these examples are merely set forth to illustrate the present invention and are not to be construed as limiting the scope of the present invention.

EXAMPLE

Example

Catalyst ink was prepared as follows.

As a noble-metal/transition-metal alloy catalyst, a Pt—Ni alloy catalyst was used. The alloy catalyst was supported on a carbon support. The noble-metal/transition-metal alloy catalyst was added to a solvent together with a Nafion ionomer, thus preparing a solution.

The solvent was added with an aminophosphonic acid-type chelating resin represented by Structural Formula 1 and allowed to react at a temperature of about 25° C. for about 20 hr, thus forming an aggregate of the chelating resin and the eluted transition metal.

After termination of the reaction, the solution was filtered, thus removing the aggregate, thereby manufacturing catalyst ink.

The catalyst ink was applied on a release sheet and dried at a temperature of about 80° C., thus forming a catalyst layer. The catalyst layer was transferred to an electrode membrane, thus manufacturing a membrane-electrode assembly.

Comparative Example

A solution containing eluted transition metal that was not removed was used as catalyst ink. The specific components thereof were the same as in the above Example. The catalyst ink was applied on a release sheet and dried at a temperature of about 90° C., thus forming a catalyst layer. The catalyst layer was transferred to an electrode membrane, thus manufacturing a membrane-electrode assembly.

Test Example 1—Amount of Eluted Transition Metal in Solution

The amount of the eluted transition metal contained in the catalyst ink of each of Example and Comparative Example was measured. The results thereof are shown in Table 1 below.

TABLE 1

| No. | Analysis item[1] | Amount |
|---|---|---|
| Comparative Example | Iron (Fe) | 95.2 mg/l |
|  | Nickel (Ni) | 3.39 wt % |
| Example | Iron (Fe) | 69.5 mg/l |
|  | Nickel (Ni) | 2.33 wt % |

[1]The amount of each component contained in a sample, taken in a small amount fmm the solution, was determined.

As shown in Table 1, the eluted transition metal can be significantly removed from the solution by adding the solution with the polymer particles and carrying out the reaction as in Example.

Test Example 2—Evaluation of Cell Performance

The performance of the membrane-electrode assembly of each of Example and Comparative Example was evaluated. The current was maintained at 1 A/cm$^2$ and the cell voltage was measured. The results thereof are shown in FIG. 1. The cell voltage of the membrane-electrode assembly of Example was increased and thus cell performance is improved.

As described hereinbefore, the test examples and examples of the present invention have been described in detail, but the scope of the present invention is not limited to the test examples and examples described above. Various modifications and improvements that will be obvious to those skilled in the art from the basic concept of the present invention defined in the accompanying claims are also included in the scope of the present invention.

What is claimed is:

1. A method of manufacturing catalyst ink for a fuel cell, comprising:
   admixing 1) an alloy catalyst comprising a noble metal and a transition metal and 2) polymer particles, whereby an aggregate comprising i) the transition metal and ii) polymer particles forms,
   wherein an admixture is provided comprising an alloy catalyst comprising a noble metal and a transition metal, an ionomer and a solvent; and
   the admixture and the polymer particles to form the aggregate comprising 1) the transition metal eluted from the alloy catalyst and 2) the polymer particles,
   wherein the aggregate is removed by filtration wherein the polymer particles comprise a chelating resin.

2. The method of claim 1, wherein the noble metal comprises one or more selected from the group consisting of platinum (Pt), iridium (Ir), palladium (Pd), ruthenium (Ru), rhodium (Rd), gold (Au), ad silver (Ag).

3. The method of claim 1, wherein the transition metal comprises one or more selected from the group consisting of cobalt (Co), nickel (Ni), yttrium (Y), chromium (Cr), manganese (Mn), copper (Cu), lanthanum (La), and scandium (Sc).

4. The method of claim 1, wherein the alloy catalyst is supported on a support.

5. The method of claim 1, wherein the polymer particles comprise, as a functional group, one or more chelating formation groups selected from the group consisting of glutamine, amidoxime, thiol, iminodiacetic acid, aminophosphonic acid, phosphonic acid, sulfonic acid, polyamine, thiourea, aminomethyl phosphonic acid, benzylamine, tertiary amine, and derivatives thereof.

6. The method of claim 1, wherein the polymer particles comprise, as a main chain, one or more selected from the group consisting of polystyrene, polyacryl and divinylbenzene,
   wherein the polymer particles comprises one or more selected from the group consisting of Structural Formula 1 and Structural Formula 2.

[Structural Formula 1]

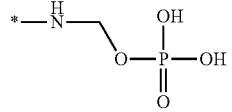

Here, * designates the connection point with the main chain.

[Structural Formula 2]

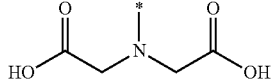

Here, * designates the connection point with the main chain.

7. The method of claim 1, wherein the polymer particles have an average diameter ranging from about 300 μm to about 800 μm.

8. The method of claim 1, wherein the admixture is added with the polymer particles and allowed to react at a temperature of about 25° C. to about 60° C. for about 10 hr to 30 hr to afford an aggregate of the transition metal and the polymer particles.

9. The method of claim 1, wherein the aggregate is removed by filtering the admixture using a filter of 32 mesh to 400 mesh.

10. A method of manufacturing an electrode for a fuel cell, comprising:
    preparing catalyst ink manufactured by a method of claim 1; and
    forming a catalyst layer by applying the catalyst ink on a substrate and performing drying.

* * * * *